United States Patent Office.

BENJAMIN F. SMITH, NEW ORLEANS, LOUISIANA, ASSIGNOR OF ONE-HALF HIS RIGHT TO G. L. LAUGHLAND, OF SAME PLACE.

Letters Patent No. 111,984 dated February 21, 1871.

IMPROVEMENT IN NON-CONDUCTING MATERIALS FOR COVERING STEAM-BOILERS, &c.

The Schedule referred to in these Letters Patent and making part of the same.

I, BENJAMIN F. SMITH, of New Orleans, in the parish of Orleans and State of Louisiana, have invented a certain new and Improved Non-conducting Material or Substance, of which the following is a specification:

The importance of perfect non-conducting materials for purposes of practical utility, whether the same be required in abstruse scientific operations or in the ordinary domestic necessities and requirements, is rendered obviously apparent to all whose experience in their use may have compelled them of necessity to consider the subject.

In the application of a non-conducting material or substance for the simple purpose of avoiding the exposure of pipes and boilers containing steam to atmosphereic influences, whereby loss of steam from evaporation and condensation is prevented, and a consequent economy in the amount of fuel required for its generation, the necessity and importance of possessing an efficient as well as a cheap and easily accessible material will be clearly obvious to every intelligent, experienced, and practical engineer. Nor is its application less beneficial in the preservation of the one single article, ice, which of late years, has become of such extensive commercial importance by reason of its almost universal use and consumption throughout not only our own great country, but, by reason of its extensive exportation to other countries, especially to the tropics, where it has become one of the greatest luxuries which the people of those regions enjoy.

It is scarcely necessary in this preliminary to enumerate the many useful purposes to which a non-conductor may be applicable in the arts or in domestic economy. It is amply sufficient for the purpose of setting forth the nature and object of my invention or discovery to declare what, by actual and personal experience, I have proven to be efficient and cheap, and what I verily believe to be new, novel, and hitherto unknown or brought into practical use, or in any manner made applicable for the purposes above enumerated, or for any other purpose not herein enumerated and for which a non-conductor may be required, such as ice-chests, ice-houses, refrigerators, the lining for cars or other vessels used in the transportation of ice, &c.

For the accomplishment and attainment of the many desirable results and purposes to which allusion has herein been made, and for the production of a cheap, efficient, and perfect non-conductor, and one which in all respects is an ample substitute for hair or other felts at present in general and common use, I take the hulls of cotton-seed and saturate them either with lime-water or bisulphate of lime, and carbolic acid or their equivalents, which renders them perfectly fire-proof, and preserves them by effectually preventing fermentation and decay. I sometimes add the hulls of rice, or use either of them separately or combined as either of them may be conveniently attainable. The material thus prepared I usually place between cotton cloth or other cheap fibrous material, and thus produce the non-conductor for all the purposes above enumerated and to which allusion has been made herein.

What I desire to secure by Letters Patent is the following.

Claim.

1. The hulls of cotton or rice-seed, either separately or combined, as a basis for a non-conducting covering for boilers, pipes, and other purposes.

2. The hulls of cotton or rice-seed, either separately or combined, treated in the manner above described, for the purpose specified.

BENJ. F. SMITH.

Witnesses:
H. N. JENKINS,
L. J. OLMSTEAD.